United States Patent
Lindheimer et al.

(10) Patent No.: US 11,089,517 B2
(45) Date of Patent: Aug. 10, 2021

(54) TRAFFIC AVAILABILITY IN A CELLULAR COMMUNICATION NETWORK

(71) Applicant: TELEFONAKTIEBOLAGET LM ERICSSON (PUBL), Stockholm (SE)

(72) Inventors: Christofer Lindheimer, Linköping (SE); Jari Vikberg, Järna (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 128 days.

(21) Appl. No.: 15/039,292

(22) PCT Filed: Mar. 9, 2016

(86) PCT No.: PCT/EP2016/055066
§ 371 (c)(1),
(2) Date: May 25, 2016

(87) PCT Pub. No.: WO2017/152976
PCT Pub. Date: Sep. 14, 2017

(65) Prior Publication Data
US 2018/0092003 A1    Mar. 29, 2018

(51) Int. Cl.
*H04W 28/26* (2009.01)
*H04L 12/911* (2013.01)
*H04L 12/703* (2013.01)
*H04L 12/707* (2013.01)
(Continued)

(52) U.S. Cl.
CPC ............. *H04W 28/26* (2013.01); *H04L 45/22* (2013.01); *H04L 45/28* (2013.01); *H04L 47/728* (2013.01); *H04L 47/74* (2013.01); *H04L 47/822* (2013.01); *H04L 45/128* (2013.01); *H04L 45/24* (2013.01); *H04L 47/125* (2013.01)

(58) Field of Classification Search
CPC ....... H04W 28/26; H04L 47/822; H04L 47/74
See application file for complete search history.

(56) References Cited

U.S. PATENT DOCUMENTS

2003/0204616 A1* 10/2003 Billhartz ............... H04L 45/302
709/235
2005/0097243 A1* 5/2005 Yamashita ............ G06F 3/0605
710/38
(Continued)

FOREIGN PATENT DOCUMENTS

CN       101778423 A      7/2010

OTHER PUBLICATIONS

Chinese Office Action issued for Chinese Application No. 201680083331.3—dated Sep. 24, 2020.

*Primary Examiner* — Jeffrey M Rutkowski
*Assistant Examiner* — Chae S Lee
(74) *Attorney, Agent, or Firm* — Baker Botts, LLP

(57) ABSTRACT

A network node and a method performed in a network node of a cellular communication network comprising the steps of obtaining an indicator to secure a traffic availability for a connection, wherein the traffic availability is related to how likely the connection will remain operable, determining whether the network node can secure resources to support the traffic availability, allocating resources for the connection when resources can support the traffic availability, and transmitting a positive response when the network node can secure resources to support the traffic availability.

27 Claims, 5 Drawing Sheets

(51) Int. Cl.
*H04L 12/735* (2013.01)
*H04L 12/803* (2013.01)

(56) References Cited

U.S. PATENT DOCUMENTS

| | | | |
|---|---|---|---|
| 2005/0157697 A1* | 7/2005 | Lee | H04L 45/128 370/349 |
| 2008/0192752 A1* | 8/2008 | Hyslop | H04W 74/06 370/395.21 |
| 2008/0220790 A1 | 9/2008 | Cai et al. | |
| 2008/0259853 A1* | 10/2008 | Ito | H04L 12/5691 370/329 |
| 2009/0016331 A1* | 1/2009 | Shah | H04L 45/128 370/356 |
| 2011/0044163 A1* | 2/2011 | Nishioka | H04L 45/00 370/217 |
| 2011/0314145 A1* | 12/2011 | Raleigh | H04L 41/0893 709/224 |
| 2013/0286942 A1* | 10/2013 | Bonar | H04B 7/0689 370/328 |
| 2014/0226967 A1* | 8/2014 | Ahuja | H04L 45/28 398/5 |
| 2015/0023149 A1* | 1/2015 | Tochio | H04L 45/28 370/217 |

* cited by examiner

TRAFFIC AVAILABILITY IN A CELLULAR COMMUNICATION NETWORK

This application is a 371 of International Application No. PCT/EP2016/055066, filed Mar. 9, 2016, the disclosure of which is fully incorporated herein by reference.

TECHNICAL FIELD

The invention relates to methods, computer programs, computer program products, network nodes and wireless devices for traffic availability in a cellular communication network.

BACKGROUND

Wireless communication in cellular networks is constantly evolving. At the moment, the communications industry puts a lot of focus on what is commonly referred to as "5G" (fifth generation) cellular networks. However, what 5G actually is, or will be is not completely clear at the moment. Part of the discussions concern what 5G should be able to do, or rather, what types of services and what performance that could be expected from 5G. This discussion connects to various use cases or usage scenarios that are envisioned. While there are still a lot of focus on quite obvious such use cases, such as web browsing, streaming services, video/audio communication and such, there are also quite different ones. One such example is sometimes referred to as Ultra-Reliability and Ultra-Low Latency Communication, or UraLLC, for short. In this category of use cases, we find, for example, communication required to monitor and manage power grids or other critical installations, to remotely steer vehicles and machines or to perform remote surgery on patients. In these scenarios there is virtually no room for errors or other unpredictable behaviour. The connection between controller and executing entities simply has to work.

In the prior art, there is the concept of quality of service (QoS). However, QoS metrics generally refer to measures like error rates, bit rates, throughput, transmission delay, jitter etc. In summary, the current QoS relates only refer to a performance quality which is not sufficient for UraLLC.

SUMMARY

It is an object to provide support to secure traffic availability in a cellular communication network.

According to a first aspect, it is provided a method performed in a network node of a cellular communication network. The method comprises the steps of: obtaining an indicator to secure a traffic availability for a connection, wherein the traffic availability is related to how likely the connection will remain operable; determining whether the network node can secure resources to support the traffic availability; allocating resources for the connection when resources can support the traffic availability; and transmitting a positive response when the network node can secure resources to support the traffic availability.

The step of obtaining an indicator may comprise receiving a request comprising the indicator.

The step of obtaining an indicator may comprise determining the indicator based on a wireless device of one end of the connection.

The step of obtaining an indicator may comprise determining the indicator based on a network slice associated with the connection.

The step of obtaining an indicator may comprise determining the indicator based on a user service identifier for the wireless device.

The method may further comprise the steps of: determining a lower traffic availability that can be secured, when the network node is unable to secure resources to support the traffic availability, the lower traffic availability being lower than the traffic availability of the indicator; and transmitting a negative response when the network node is unable to secure resources to support the traffic availability, the negative response comprising the lower traffic availability; in which case the method is repeated for any new request comprising an indicator to secure the lower traffic availability.

The step of determining whether the network node can secure resources may comprise: determining whether the network node can secure internal resources to support the traffic availability; and determining external capability by determining whether a link connected to the network node or another network node can secure external resources to support the traffic availability.

The step of determining external capability may comprise: transmitting a request to an external resource to secure the traffic availability for the connection; and receiving a response from the external resource indicating whether the external resource can support the traffic availability.

The traffic availability may comprises a plurality of availability parameters.

The traffic availability may comprise an availability parameter indicating a number of redundant communication paths.

The availability parameter indicating a number of redundant communication paths may be greater than one, in which case the traffic availability may comprise an indicator of maximum acceptable number of common nodes, being common between at least two of the redundant communication paths.

The traffic availability may comprise any one or more of: a parameter indicating maximum relative processor load of traversed network nodes, a parameter indicating maximum relative link load of traversed links, a parameter indicating operable power backup of traversed network nodes, a parameter indicating a rate of packets which are passed through traversed network nodes, a parameter indicating a rate of packets which are passed through traversed links, a parameter indicating a proportion of time that traversed network nodes are operable, a parameter indicating a proportion of time that traversed links are operable, number of network node breaks per time unit, and number of node breaks per time unit.

The method may further comprise the step of: transmitting a warning signal when the network node detects an event which negatively affects traffic availability of the connection.

According to a second aspect, it is provided a network node comprising: a processor; and a memory. The memory stores instructions that, when executed by the processor, causes the network node to: obtain an indicator to secure a traffic availability for a connection, wherein the traffic availability is related to how likely the connection will remain operable; determine whether the network node can secure resources to support the traffic availability; allocate resources for the connection when resources can support the traffic availability; and transmit a positive response when the network node can secure resources to support the traffic availability.

The instructions to obtain an indicator may comprise instructions that, when executed by the processor, causes the network node to receive a request comprising the indicator.

The instructions to obtain an indicator may comprise instructions that, when executed by the processor, causes the network node to determine the indicator based on a wireless device of one end of the connection.

The instructions to obtain an indicator may comprise instructions that, when executed by the processor, causes the network node to determine the indicator based on a network slice associated with the connection.

The instructions to obtain an indicator may comprise instructions that, when executed by the processor, causes the network node to determine the indicator based on a user service identifier for the wireless device.

The network node may further comprise instructions that, when executed by the processor, causes the network node to: determine a lower traffic availability that can be secured, when the network node is unable to secure resources to support the traffic availability, the lower traffic availability being lower than the traffic availability of the indicator; and transmit a negative response when the network node is unable to secure resources to support the traffic availability, the negative response comprising the lower traffic availability; in which case mentioned instructions area repeated for any new request comprising an indicator to secure the lower traffic availability.

The instructions to determine whether the network node can secure resources may comprise instructions that, when executed by the processor, causes the network node to: determine whether the network node can secure internal resources to support the traffic availability; and determine external capability by determining whether a link connected to the network node or another network node can secure external resources to support the traffic availability.

The instructions to determine external capability may comprise instructions that, when executed by the processor, causes the network node to: transmit a request to an external resource to secure the traffic availability for the connection; and receive a response from the external resource indicating whether the external resource can support the traffic availability.

The traffic availability may comprise a plurality of availability parameters.

The traffic availability may comprise an availability parameter indicating a number of redundant communication paths.

The availability parameter indicating a number of redundant communication paths may be greater than one, in which case the traffic availability may comprise an indicator of maximum acceptable number of common nodes, being common between at least two of the redundant communication paths.

The traffic availability may comprises any one or more of: a parameter indicating maximum relative processor load of traversed network nodes, a parameter indicating maximum relative link load of traversed links, a parameter indicating operable power backup of traversed network nodes, a parameter indicating a rate of packets which are passed through traversed network nodes, a parameter indicating a rate of packets which are passed through traversed links, a parameter indicating a proportion of time that traversed network nodes are operable, a parameter indicating a proportion of time that traversed links are operable, number of network node breaks per time unit, and number of node breaks per time unit.

The network node may further comprise instructions that, when executed by the processor, causes the network node to: transmit a warning signal when the network node detects an event which negatively affects traffic availability of the connection.

According to a third aspect, it is provided a network node comprising: means for obtaining an indicator to secure a traffic availability for a connection, wherein the traffic availability is related to how likely the connection will remain operable; means for determining whether the network node can secure resources to support the traffic availability; means for allocating resources for the connection when resources can support the traffic availability; and means for transmitting a positive response when the network node can secure resources to support the traffic availability.

According to a fourth aspect, it is provided a computer program. The computer program comprises computer program code which, when run on a network node causes the network node to: obtain an indicator to secure a traffic availability for a connection, wherein the traffic availability is related to how likely the connection will remain operable; determine whether the network node can secure resources to support the traffic availability; allocate resources for the connection when resources can support the traffic availability; and transmit a positive response when the network node can secure resources to support the traffic availability.

According to a fifth aspect, it is provided a computer program product comprising a computer program according to the fourth aspect and a computer readable means on which the computer program is stored.

According to a sixth aspect, it is provided a method performed in a wireless device of a cellular communication network. The method comprises the steps of: transmitting a request to a network node, the request comprising an indicator to secure a traffic availability for a connection, wherein the traffic availability is related to how likely the connection will remain operable; receiving a positive response when the network node can support the traffic availability; and receiving a warning signal when the network node detects an event which negatively affects traffic availability of the connection.

The method may further comprise the step of: presenting a user warning indicating reduced traffic availability on a user output device of the wireless device.

The method may further comprise the step of: renegotiating a new traffic availability with the network node.

According to a seventh aspect, it is provided a wireless device comprising: a processor; and a memory. The memory stores instructions that, when executed by the processor, causes the wireless device to: transmit a request to a network node, the request comprising an indicator to secure a traffic availability for a connection, wherein the traffic availability is related to how likely the connection will remain operable; receive a positive response when the network node can support the traffic availability; and receive a warning signal when the network node detects an event which negatively affects traffic availability of the connection.

The wireless device may further comprise instructions that, when executed by the processor, causes the wireless device to: present a user warning indicating reduced traffic availability on a user output device of the wireless device.

The wireless device may further comprise instructions that, when executed by the processor, causes the wireless device to: renegotiate a new traffic availability with the network node.

According to an eighth aspect, it is provided a wireless device comprising: means for transmitting a request to a network node, the request comprising an indicator to secure a traffic availability for a connection, wherein the traffic availability is related to how likely the connection will remain operable; means for receiving a positive response when the network node can support the traffic availability; and means for receiving a warning signal when the network node detects an event which negatively affects traffic availability of the connection.

According to a ninth aspect, it is provided a computer program, the computer program comprising computer program code which, when run on a wireless device causes the wireless device to: transmit a request to a network node, the request comprising an indicator to secure a traffic availability for a connection, wherein the traffic availability is related to how likely the connection will remain operable; receive a positive response when the network node can support the traffic availability; and receive a warning signal when the network node detects an event which negatively affects traffic availability of the connection.

According to a tenth aspect, it is provided a computer program product comprising a computer program according to the ninth aspect and a computer readable means on which the computer program is stored.

Here now follows a set of definitions which used in the description and claims herein.

Traffic availability is to be construed as an indicator of reliability of a connection. Traffic availability is related to how likely the connection will remain operable. Its complement, traffic unavailability, could equally well be used.

Network node is to be construed as a node in a cellular communication network or wide area network which can be used in securing traffic availability. The network node can be part of the user plane and/or the control plane. The network node can be implemented in a single physical device or can be distributed over several physical devices.

Link is to be construed as a communication channel between two network nodes.

Connection is to be construed as a communication path between one communication party and another, including any network nodes and links therebetween.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Using embodiments presented herein, it is possible to both represent traffic availability for a connection as well as provide the opportunity to put requirements on a connection, e.g., at connection set-up. The traffic availability expands well beyond QoS measurements by relating to how likely the connection will remain operable, giving a complete new dimension of ensuring reliability required for ultra reliable operation, such as remote surgery, remote vehicle or machine operation, etc. In addition, the different embodiments describe how availability requirements can be evaluated and calculated.

Figure 1:
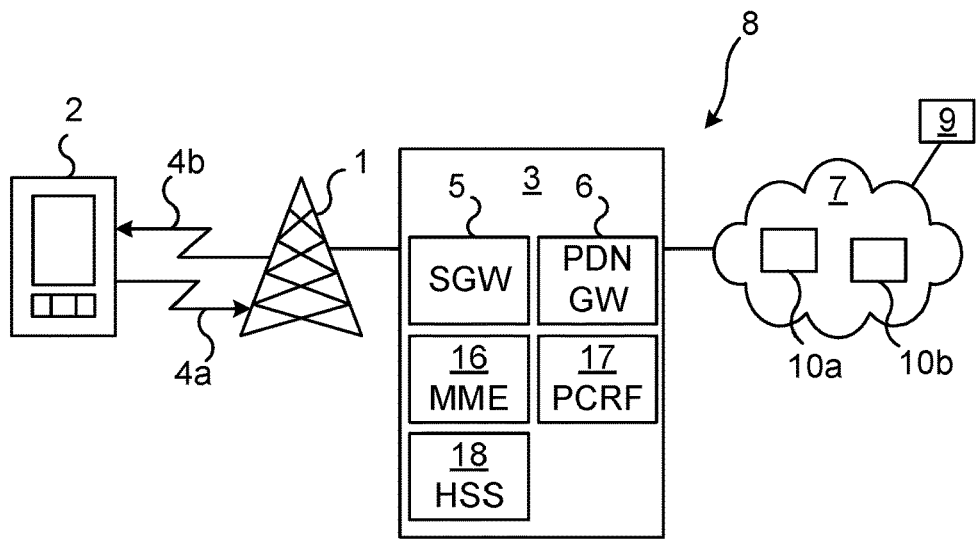
FIG. 1 is a schematic diagram illustrating a cellular communication network where embodiments presented herein may be applied.

FIG. 1 is a schematic diagram illustrating a cellular communication network 8 where embodiments presented herein may be applied. The cellular communication network 8 comprises a core network 3 and one or more radio access nodes 1, here e.g. in the form of radio base stations being evolved Node Bs, also known as eNode Bs or eNBs. The radio access node 1 is a network node and could also be in the form of Node Bs, BTSs (Base Transceiver Stations) and/or BSSs (Base Station Subsystems), WLAN (Wireless Local Area Network) access points, etc. The radio access node 1 provides radio connectivity over a wireless interface 4a-b to a plurality of wireless devices 2. The term wireless device is also known as mobile communication terminal, user equipment (UE), mobile terminal, user terminal, user agent, wireless terminal, machine-to-machine device etc., and can be, for example, what today are commonly known as a mobile phone, smart phone or a tablet/laptop with wireless connectivity. The term wireless is here to be construed as having the ability to perform wireless communication. More specifically, the wireless device 2 can comprise a number of wires for internal and/or external purposes.

The cellular communication network 8 may e.g. comply with any one or a combination of LTE (Long Term Evolution), W-CDMA (Wideband Code Division Multiplex), EDGE (Enhanced Data Rates for GSM (Global System for Mobile communication) Evolution), GPRS (General Packet Radio Service), CDMA2000 (Code Division Multiple Access 2000), or any other current or future wireless network, such as LTE-Advanced, as long as the principles described hereinafter are applicable. Further, the radio access part of the communication network 8 may also include access according to other radio access technologies, e.g. any of the WLAN standards IEEE 802.11x, including physical and Media Access Control specifications. Specifically, it is currently not specified what interfaces and components that would be included in a 5G network architecture, nor how such components would be implemented. For example, functionality that usually is common to relate to, e.g., a physical node in a radio network, like mobility functions in an eNB, may very well be implemented as a virtual function on a platform or physical machine that is not part of physical equipment of the radio network. Also, in a 5G timeframe, it is not unlikely that certain portions of the complete communications network will not directly map to specific physical nodes, but rather find their realization as a logical aggregate of network functionality that utilize computing processes on various processing machines. Embodiments presented herein is to be considered applicable for any such network, irrespective of the network structure and implementation.

Over the wireless interface, uplink (UL) communication 4a occurs from the wireless device 2 to the radio access node 1 and downlink (DL) communication 4b occurs from the radio access node 1 to the wireless device 2. The quality of the wireless radio interface to each wireless device 2 can vary over time and depending on the position of the wireless device 2, due to effects such as fading, multipath propagation, interference, etc.

The radio access node 1 is also connected to the core network 3 for connectivity to central functions and a wide area network 7, such as the Internet.

The core network 3 comprises a number of network nodes used for various parts of the user plane and the control plane. The user plane is used for the transfer of user data to and from the wireless device 2. The control plane contains resources for controlling traffic in the network, allowing for a strict separation between the control plane and user plane. In FIG. 1, the subset of network nodes in the core network 3 are shown: an SGW (Serving Gateway) 5, a PDN GW (Packet Data Network Gateway) 6, an MME (Mobility Management Entity) 16, a PCRF (Policy Control and Charging Rules Function) 17 and an HSS (Home Subscriber Server) 18.

The SGW 5 is a network node which acts as the anchor point for wireless device mobility, and also includes other functionalities such as temporary DL data buffering while the wireless device is being paged, packet routing and forwarding to the right eNB.

The PDN-GW 6 is the network node responsible for IP (Internet Protocol) address allocation for the wireless device 2, as well as Quality of Service (QoS) enforcement.

The MME 16 is a network node being a control node for the access network, responsible for tasks such as idle mode tracking of the wireless devices 2, paging, retransmission, bearer activation/deactivation, etc.

The PCRF 17 determines policy rules in real-time with respect to the wireless devices 2 of the system. This may e.g. include aggregating information in real-time to and from the core network and operational support systems, etc. of the system so as to support the creation of rules and/or automatically making policy decisions for user radio terminals currently active in the system based on such rules or similar.

The HSS 17 is the network node which contains the subscription related information in order to support handling of calls and/or data sessions.

In the wide area network 7, there may be network nodes 10a-b being intermediate network nodes, such as routers, for forwarding packets. Using the cellular communication network 8 and wide area network 7, wireless devices 2 can communicate with other resources 9 available through the wide area network. Such as resource 9 can e.g. be a server or another wireless device connected to another cellular communication network.

Figure 2:
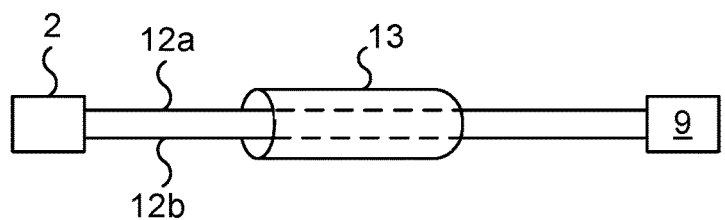
FIG. 2 is a schematic diagram illustrating communication between a wireless device and a resource.

FIG. 2 is a schematic diagram illustrating communication between a wireless device 2 and a resource 9.

The communication is here represented by a connection 13 which is a way for the network between the wireless device 2 and the resource 9 to provide an ability of communication. The connection 13 comprises all network nodes (in the control pane and/or user plane) and links required to enable the communication. In the example of FIG. 2, the connection is made up of two redundant communication paths: a first communication path 12a and a second communication path 12b. In this way, if one or more network nodes or links of the first communication path 12a were to fail, there is still a connection through the connection 13 using the second communication path 12b, albeit possibly with reduced bandwidth.

Figure 3:
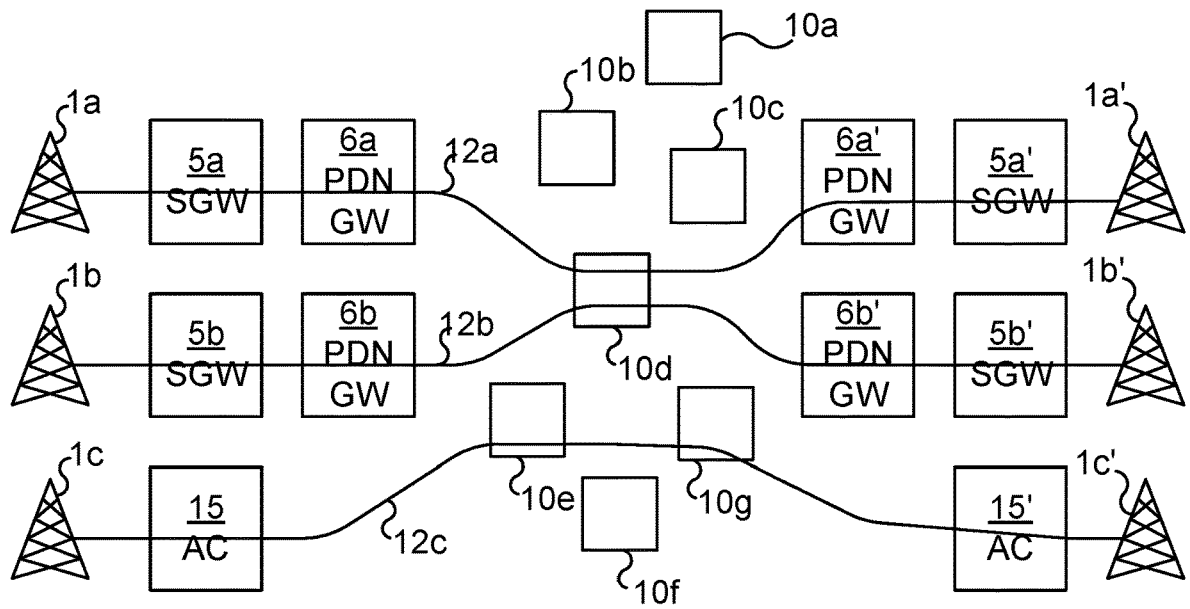
FIG. 3 is a schematic diagram illustrating a more complex scenario of communication paths.

FIG. 3 is a schematic diagram illustrating a more complex scenario of communication paths illustrating common nodes between redundant communication paths.

In this example, the left hand side represents one end of a connection and the right hand side represents the other end of a connection. On the left, there are three radio access nodes 1a-c, two SGWs 5a-b and two PDN-GWs 6a-b. Moreover, there is an Access Controller AC 15 that may control one or a set of WLAN Access Points AP's 1c, for communicating over a wireless link. On the right hand side, there are also three radio access nodes 1a'-1c', two SGWs 5a'-5b', two PDN-GWs 6a'-6b' and an AC 15'.

In the middle, between the two sides, there are a number of routers 10a-10f.

A first communication path 12a passes through the first radio access node 1a on the left, a first SGW 5a on the left, a first PDN-GW 6a on the left, the fourth router 10d, the first PDN-GW 6a' on the right, the first SGW 5a' on the right and the first radio access node 1a' on the right.

A second communication path 12a passes through the second radio access node 1b on the left, a second SGW 5b on the left, a second PDN-GW 6b on the left, the fourth router 10d, the second PDN-GW 6b' on the right, the second SGW 5b' on the right and the second radio access node on the right.

A third communication path 12C passes through the third radio access node 1c on the left, the AC 15 on the left, the fifth router 10e, the seventh router 10g, the AC 15' on the right and the third radio access node 1c' on the right.

It can thus be seen that the first communication path 12a and the second communication path 12b have one common network node in the fourth router 10d.

Hence, if the fourth router were to fail, this would affect both the first communication path 12a and the second communication path 12b negatively. Nevertheless, all other network nodes and links of the two communication paths 12a-b are separate, whereby the two paths 12a-b provide a much better traffic availability when used together. One parameter which can be used to describe this situation is a common node counter. For the communication paths 12a-c in this example, there is one common node (10d) of the connection, whereby the common node counter has the value of one.

Figure 4:
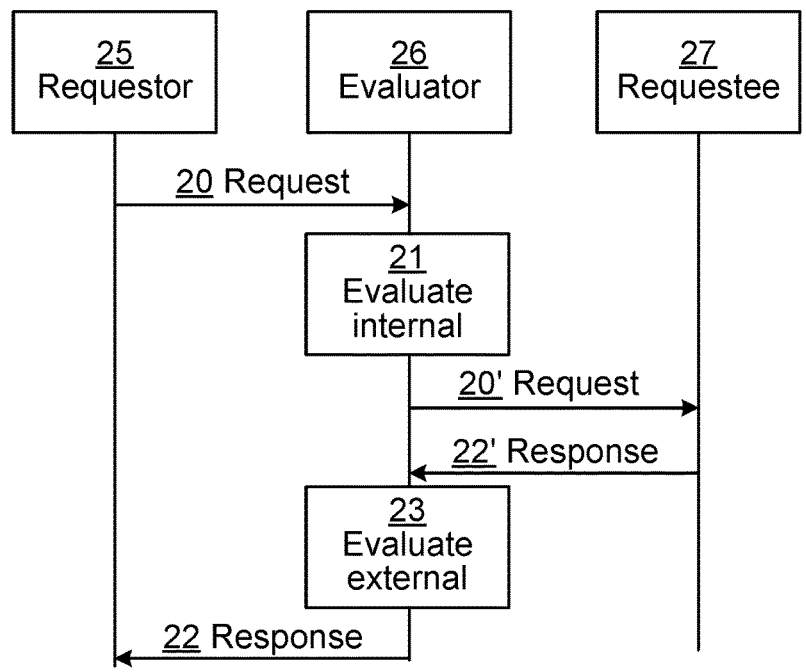
FIG. 4 is a sequence diagram illustrating communication between nodes to secure traffic availability.

FIG. 4 is a sequence diagram illustrating communication in between nodes to secure traffic availability. The network node performing the evaluation is the evaluator 26. The requestor 25 can be another network node or a wireless device. The requestee 27 can be another network node or a wireless device.

The requestor first transmits a request 20 to the evaluator to secure traffic availability for a connection. The evaluator 26 checks internal capacity to evaluate 21 whether the evaluator 26 can internally secure requested traffic availability. The evaluator also obtains external capacity information by sending a request 20' to the next network node, the requestee 27, in the communication path of the connection. The requestee 27 provides a response 22' to the evaluator, after which the evaluator 26 can perform an external evaluation 23. Regarding the traffic availability for the link between the evaluator 26 and the requestee 27, the traffic availability of this link can be checked either by the evaluator 26 or the requestee 27, as long as the responsibility is known beforehand.

Once the evaluator 26 has evaluated both internal and external traffic availability, the evaluator 26 determines whether it can meet the traffic availability of the request 20 from the requestor 25 by combining the result from the internal determination 21 and the result from the external evaluation 23, and transmits a corresponding response 22.

If both of the internal and external evaluations are positive, the response 22 to the requestor 25 is positive. On the other hand, if one or both of the internal and external evaluations are negative, the response 22 to the requestor 25 is negative.

It is to be noted that the requestee 27 in turn can act as an evaluator 26. Hence, the sequence shown in FIG. 4 can be employed as a recursive method, proceeding through all network nodes of the communication path(s). In this way, the availability can be secured all along the communication path(s).

FIGS. 5A-D are flow charts illustrating embodiments of methods performed in any one of the network nodes 1, 1a-1c, 1a'-c', 5, 5a-b, 5a'-b', 6, 6a-b, 6a'-b', 10a-g, 15, 15', 16, 17, 18 of the cellular communication network 8 of FIG. 1. First, embodiments of the method illustrated in FIG. 5A will be described.

In an obtain indicator step 40, an indicator to secure a traffic availability for a connection is obtained. The traffic availability is related to how likely the connection will remain operable. The traffic availability thus reflects a robustness of the connection.

One example of a traffic availability parameter is an availability parameter AVA1 indicating a number of redundant communication paths between end nodes. The number of redundant communication paths is of interest from a robustness perspective, as it may indicate that if one redundant communication path fails, there is another link that can be used to continue communication. It is likely that the requirements of number of redundant communication paths may be directly related to requirements of, e.g., all the other availability parameters described below. If the other availability parameters show unreliable performance, increasing the amount of redundant communication paths may provide for an overall acceptable availability and increased reliability.

The traffic availability can comprises a plurality of availability parameters to reflect different aspects of traffic availability. For instance, the traffic availability may comprise any one or more of the following exemplifying parameters AVA2-AVA11, as well as AVA1 defined above:

AVA2: a parameter indicating maximum relative processor load of traversed network nodes. Max relative processor load of traversed nodes is an indication of how heavily loaded network nodes are. This is informational based on the assumption that the higher the load in a network node, the higher is the likelihood that a failure or even further added traffic may impact the performance related QoS and is thus informational from an overall reliability perspective.

AVA3: a parameter indicating maximum relative link load of traversed links. This is similar reason to AVA2, but instead it is now a link load that is evaluated. If a link between two nodes that is part of the connection path is heavily loaded, again, this increases the sensitivity to that further load or changes in the network may impact an ongoing connection.

AVA4: a parameter indicating operable power backup of traversed network nodes. AVA4 is a Boolean value indicating of how well a node may cope with electric power failure, if there is a back-up for traversed nodes.

AVA5: a parameter indicating a rate of packets which are passed through traversed network nodes.

AVA6: a parameter indicating a rate of packets which are passed through traversed links. AVA5 and AVA6 may be defined as the number of sent packets, divided by the total number of packets in existence in a transmission buffer.

AVA7: a parameter indicating a proportion of time that traversed network nodes are operable.

AVA8: a parameter indicating a proportion of time that traversed links are operable. AVA7 and AVA8 could also be the complement of the definitions above, i.e. a fraction of time that a network node or link is out-of-service.

AVA9: number of network node breaks per time unit (e.g. per day)

AVA10: number of node breaks per time unit (e.g. per day). AVA9 and AVA10 are thus indications of recent amount of failures.

AVA11: maximum acceptable number of common nodes (see description with reference to FIG. 3 above). This parameter can be a Boolean to indicate the need of complete separation between communication paths (i.e. no common nodes) or acceptance of common nodes. Alternatively, this parameter can be an integer indicating the number of acceptable common nodes. This AVA11 is only applicable if AVA1 is greater than one.

It should be noted that AVA1-11 are exemplary availability parameters that relate to availability and thus the reliability of a connection between two entities. Other availability parameters may be relevant, e.g., in particular in network architectures where, e.g., features and functionality are all software defined and realized using processing resources in the cloud. In such situations, a relevant availability parameters may go more towards how many control functions that share the same control interface towards a radio node or similar. Further, if a network node in a sense is in fact made up of a number of processing units that may even be distributed geographically, or be cloud-based etc., a virtual node availability parameters may be constructed based on a worst-case value of components necessary to make up the node. Thus, an availability parameters may propagate down to processing/CPU/Memory level and be aggregated upwards with the weakest-link principle that it is always the worst availability value that is the one being propagated through the system.

The indicator to secure traffic availability can be obtained using one or more of the following.

The indicator can be received explicitly in a request (see 20 of FIG. 4) comprising the indicator.

Alternatively or additionally, the indicator can be based on a wireless device of one end of the connection. For instance, the wireless device can be associated with a predetermined traffic availability using its subscription. For instance, police officers can be configured to always receive a traffic availability of a certain level based on their subscription data.

Alternatively or additionally, the indicator can be based on a network slice associated with the connection. Each network slice can have its own set of (physical and/or virtual) resources in the core network, while radio access network resources can be shared between network slices. For instance, a specific network slice can be established for remote surgery, and when a session is set up using the remote surgery network slice, a very high traffic availability is determined, compared e.g. to a media streaming network slice.

Alternatively or additionally, the indicator can be based on a user service identifier for the wireless device. For instance, deep packet inspection can be used to identify the user service and determine the traffic availability based on the user service.

In a determine resources step 42, it is determined whether the network node can secure resources to support the traffic availability.

In a conditional resources step 43, the method proceeds conditionally based on the determination in step 42. If the network node can secure resources, the method proceeds to an allocate step 44. Otherwise, the method proceeds to a transmit negative response step 45.

In the allocate step 44, resources are allocated for the connection when resources can support the traffic availability.

In a transmit positive response step 46, a positive response is transmitted.

In the transmit negative response step 45, a negative response is transmitted.

Figure 5A:
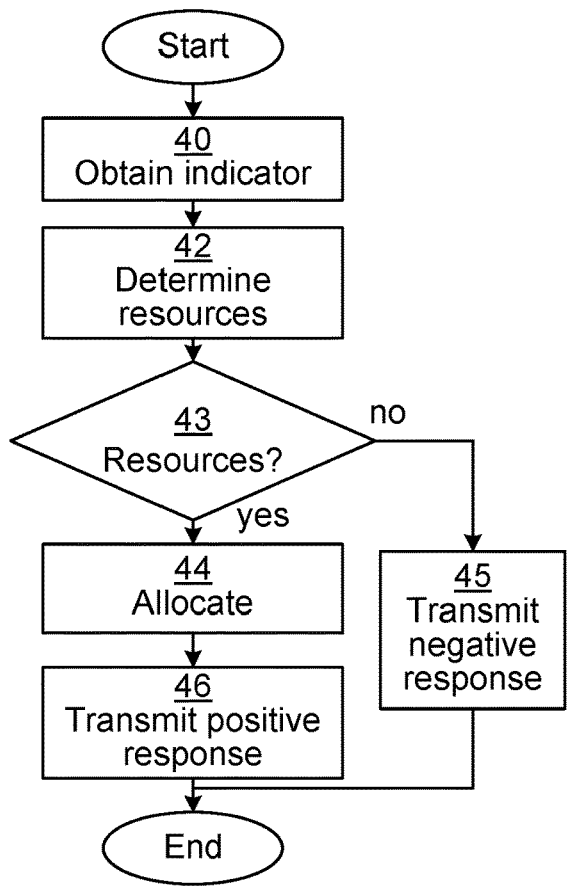
FIGS. 5A-D are flow charts illustrating embodiments of methods performed in any one of the network nodes of the cellular communication network of FIG. 1.
Figure 5B:
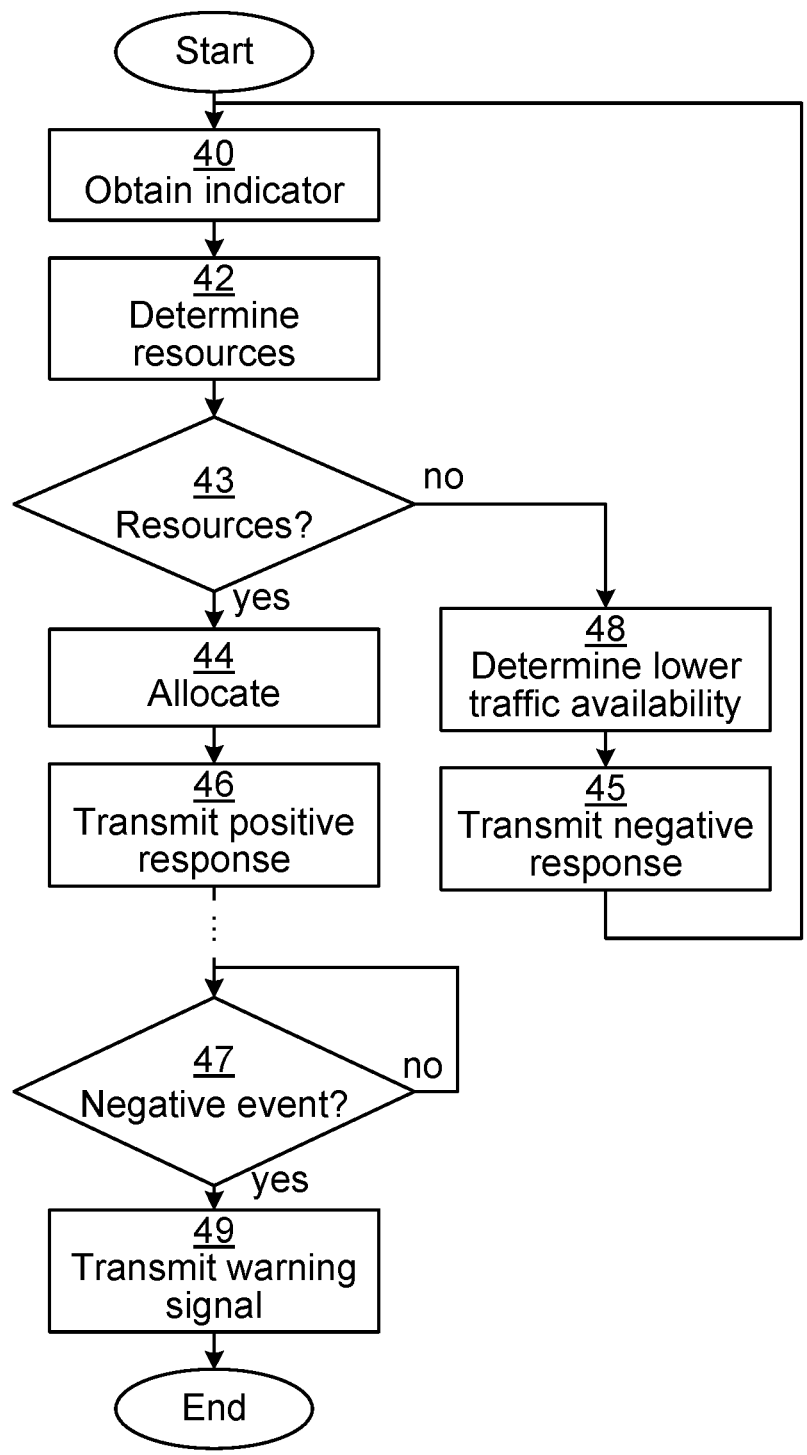

Looking now to FIG. 5B, only new or modified steps compared to FIG. 5A will be described.

In an optional determine lower traffic availability step 48, a lower traffic availability that can be secured is determined. The lower traffic availability is lower than the traffic availability of the indicator, since this step only is performed when there are not sufficient resources to secure the requested traffic availability.

In this case, the transmit negative response step 45, optionally comprises transmitting a negative response comprising the lower traffic availability. In this way, the requester can request a new traffic availability which the network node can secure. In other words, the method is then repeated for a new request comprising an indicator to secure (at most) the lower traffic availability.

In an optional conditional negative event step 47, it is determined whether the network node detects an event which negatively affects traffic availability of the connection. This may be the situation for example, if a connection including one or more redundant communication paths experience that one link fails, or that one node used by one of the communication paths is reaching a high-load situation (higher than what was originally negotiated/accepted) and that congestion actions may start occurring. In such situations, connection entities need to be notified of such a situation, even though the communication is still reaching the end points, since the reliability level is at risk.

If a negative event is detected, the method proceeds to a transmit warning signal step 49. Otherwise (when polling is used) the step is repeated, optionally after a delay (not shown).

In the transmit warning signal step 49, a warning signal is transmitted. The warning signal can be issued on the protocol level where it is detected, e.g., IP level for switching nodes, and thus propagate to the end-points using similar translation engines (see below) used for setting up the connection and negotiating the current availability level.

It would then further be possible to re-negotiate the availability, or to terminate the connection, or to attempt setup of additional redundant communication paths to meet the requirements of the connection.

Figure 5C:
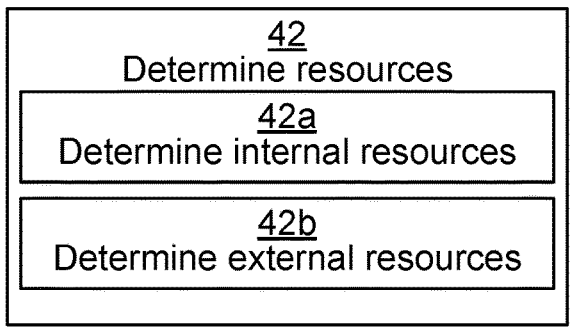

Looking now to FIG. 5C, optional substeps of the determine resources step 42 are described.

In an optional determine internal resources step 42a, the network node determined whether it can secure internal resources to support the traffic availability. This corresponds to step 21 of FIG. 4.

In an optional determine external resources step 42b, the network node determines external capability by determining whether a link connected to the network node and/or another network node can secure external resources to support the traffic availability.

When both internal resources and external resources can be secured, the network node thus determines that resources can be secured.

Figure 5D:
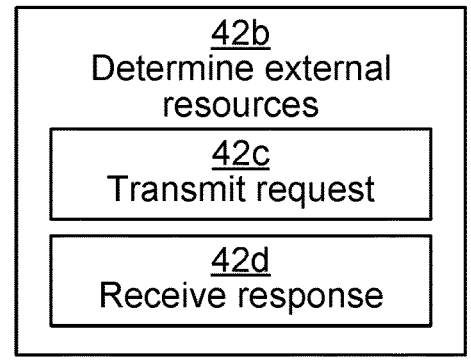

Looking now to FIG. 5D, optional substeps of the determine external resources step 42b are described.

In an optional transmit request step 42c, a request is transmitted to an external resource to secure the traffic availability for the connection. This corresponds to message 20' of FIG. 4.

In an optional receive response step 42d, a response is received from the external resource indicating whether the external resource can support the traffic availability. This corresponds to message 22' of FIG. 4.

The additions suggested above that relate to redundancy requirements for established connections can be illustrated using the QoS concept for EPS (Evolved Packet System) bearers. To get an end-to-end QoS treatment also including availability, similar QoS extensions are added to IP schemes that relate to QoS, e.g. DiffServ, RSVP (Resource Reservation Protocol), IntServ, RSVP-TE (RSVP Traffic Engineering), or NSLP (NSIS (Next Steps in Signaling) Signaling Layer Protocol). If these are not done in a way that is directly translatable (1-to-1-mapping) a translation function of such QoS reliability primitives is provided, in a similar way as is done for, e.g., VoLTE (Voice over LTE) with QCI (QoS Class Indicator) to Diff-Serv mapping.

The interpretation and mapping of the traffic availability when related to a network involving EPC could be implemented as part of the PCRF functionality and mapping between different availability representations in various protocols can be specified in a similar manner as for, e.g. VoLTE, between IP flows over Internet and EPS bearers.

An alternative way of controlling the availability aspect of a connection if just considering the radio network part and part of the core network part after, e.g., the PDN gateway, would be to introduce QoS-Availability information over an Rx interface and insert policies for certain connections that govern what availability level that is acceptable over the part of the end-to-end connection that relates to the mobile/radio network. Such availability levels, or criteria may thus also be governed from an operator or application/service provider perspective, through applying policies in the PCRF, e.g., for specific users, for specific services or any combination thereof. This Rx interface may also be used to impact the QoS mapping between, e.g., QoS primitives of EPS bearers with QoS primitives and representations on IP layer.

With signaling over the Rx interface to PCRF, for example, a fire alarm company, connecting their alarms through a cellular operator, may want all the alarms to have a quality-of-service level with respect to availability, such that the fire alarms are always served over at least two redundant communication paths (see above as AVA1). As explained above for step 40, certain subscriptions (i.e., the subscription to serve a number of fire alarms) may also have certain availability levels inherent and then information may come, not over Rx but instead be part of stored subscription data in HSS.

These types of policies may be communicated from an operator over the Rx interface, and it may be associated with a certain set of fire alarms only (e.g., a certain subscription). This Rx-driven request for availability means that any application function, or for that matter a detection function that has detected a certain traffic type, can send a request for a certain availability level to the PCRF. The PCRF would then propagate this further to PDN-GW, enforcing this functionality. These availability rules may thus be specified outside of the communications network, rather in the application layer.

The addition of a new availability parameter or a composite of several availability parameters can be done in a number of different ways. The QoS framework can be extended, or coding of an already existing field can be specified to point to another QoS information element, e.g., availability. In one example the availability related information, i.e. the separate availability parameters or a composite of several availability parameters is signalled from the core network to the radio access network when a radio bearer is to be established. In another example, the signaling of availability requirements is based on a specific set of QCI and in this case the radio access network is configured with the separate availability parameters or a composite of several availability parameters for example based on the QCI (that is signalled).

Now, various aspects of calculating aggregated availability will be described. At connection establishment, it is feasible to calculate an aggregated value of availability, including all components that are part of an end-to-end connection, or between a sub-part of a connection path. A value of availability can be defined by the weakest link in some sense and to represent an end-to-end availability value, a function is needed to aggregate availability parameters of different network portions.

As an example, consider a wireless device-to-wireless device communication case between two cities, where the initiating wireless device belongs to PLMN (Public Land Mobile Network) 1 and the receiving wireless device belongs to PLMN 2. In calculating an aggregate value of availability, thus, at least three different parts need to be considered.

A) PLMN1
B) Internet route between PDN GWs for PLMN 1 and PLMN2
C) PLMN2

For the examples availability parameters above, this could be done in the following manner:

AVA1—number of redundant communication paths: an availability parameter would be the number of paths that are established between the peers. For example, using MPTCP (Multipath Transport Control Protocol) and both PLMN1 and WLAN, it would be two communication paths. If only a single PLMN1-PLMN2 link would be established, it would be one communication path.

AVA2—max relative processor load of traversed nodes would be calculated as the reported or measured relative load of the most loaded traversed node.

AVA3—max relative link load of traversed links would be calculated as the reported or measured relative load of the most loaded traversed link (also including radio links).

AVA4—operable power backup would be a single value being true if all involved traversed network nodes report that back-up power is available and not used, otherwise it would be false.

AVA5/6—would be the minimum value of the reliability rate of any of the traversed nodes/links.

AVA7/8—would be the maximum value of out of service of any of the traversed nodes/links.

AVA 9/10—would be the maximum value of link/node breaks of any of the traversed nodes/links.

The aggregate view could be gathered in connection to the enforcement function in the PDN Gateway.

If there are back-up connections, i.e., if the number of redundant communication paths are greater than one, one principle could be to always calculate and report the most reliable availability parameter for one and the same link, but never mix the values and pick an aggregated AVA4 value from, e.g., path 1 and an aggregated AVA3-value from path 2.

As has been described above, a number of different availability parameters are provided to include in QoS schemes, both in mobile network, i.e., for EPS or similar bearers, as well as for IP level communications, and translation functions therebetween have been mentioned. Further, with availability being a complex area and increasingly difficult to parameterize in scenarios when some of the network functionality rely on processing possibilities implemented on cloud level, an aggregated availability parameter may become inevitable and this aggregated availability parameter may be an aggregate of., e.g., availability parameters similar to AVA1-11 as described above and it may further indicate an availability profile with AVA1-11 as components in such a profile. For example, an availability profile 1 can imply specific values with respect to AVA1, AVA2, etc. On the other hand, an availability profile 2 can imply at least one different specific value with respect to AVA1, AVA2, etc. compared to availability profile 1. At bearer establishment and for enforcement and alarm functionality, it is thus the availability profile that is requested and enforced.

Figure 6A:
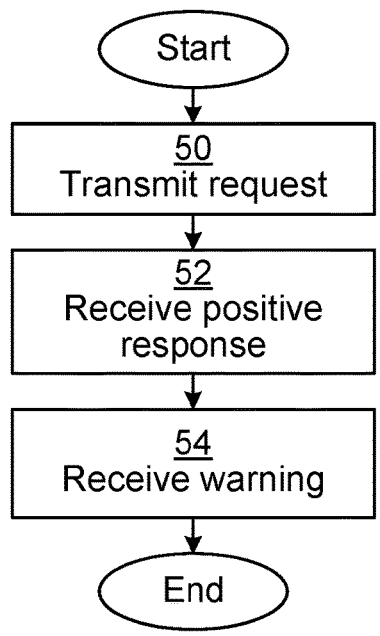
FIGS. 6A-B are flow charts illustrating embodiments of methods performed in the wireless device of FIG. 1.
Figure 6B:
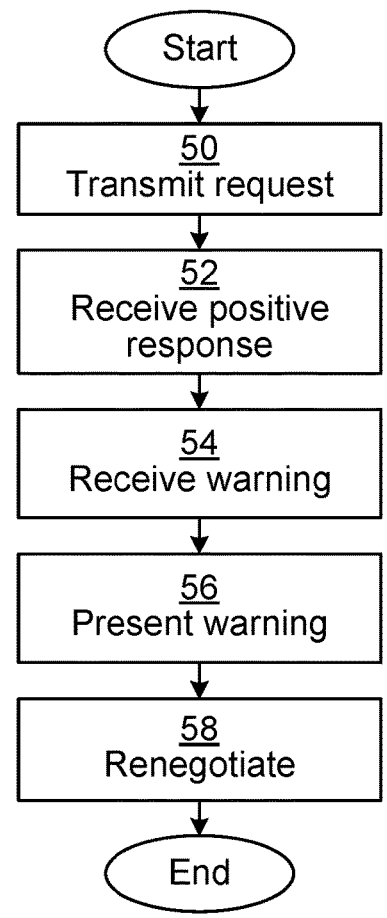

FIGS. 6A-B are flow charts illustrating embodiments of methods performed in the wireless device 2 of FIG. 1. First, embodiments of the method illustrated in FIG. 6A will be described.

In a transmit request step 50, the wireless device transmits a request to a network node. The request comprises an indicator to secure a traffic availability for a connection. As explained above, the traffic availability is related to how likely the connection will remain operable.

In a receive positive response step 52, a positive response is received, indicating that the network node can support the traffic availability.

In a receive warning step 54, a warning signal is received when the network node detects an event which negatively affects traffic availability of the connection.

Looking now to FIG. 6B, only new or modified steps compared to FIG. 6A will be described.

In an optional present warning step 56, the wireless device presents a user warning indicating reduced traffic availability on a user output device (169 of FIG. 9) of the wireless device.

In an optional renegotiate step 58, a new traffic availability is renegotiated with the network node.

Figure 7:
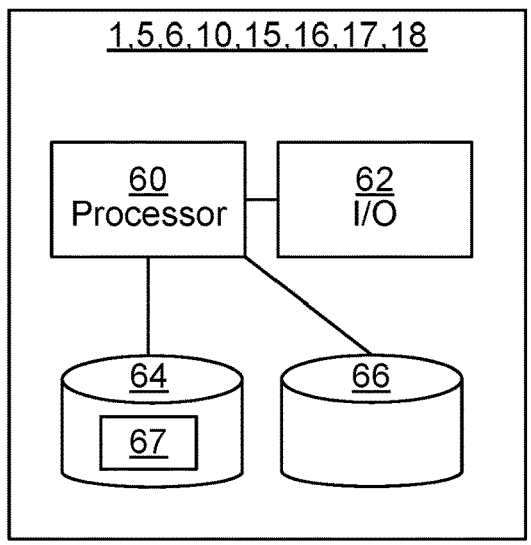
FIG. 7 is a schematic diagram illustrating components of any of the network nodes of FIG. 1.

FIG. 7 is a schematic diagram illustrating components of any of the network nodes 1, 1a-1c, 1a'-c', 5, 5a-b, 5a'-b', 6, 6a-b, 6a'-b', 10a-g, 15, 15', 16, 17, 18 of FIG. 1. A processor 60 is provided using any combination of one or more of a suitable central processing unit (CPU), multiprocessor, microcontroller, digital signal processor (DSP), application specific integrated circuit etc., capable of executing software instructions 67 stored in a memory 64, which can thus be a computer program product. The processor 60 can be configured to execute the method described with reference to FIGS. SA-D above.

The memory 64 can be any combination of read and write memory (RAM) and read only memory (ROM). The memory 64 also comprises persistent storage, which, for example, can be any single one or combination of magnetic memory, optical memory, solid state memory or even remotely mounted memory.

A data memory 66 is also provided for reading and/or storing data during execution of software instructions in the processor 60. The data memory 66 can be any combination of read and write memory (RAM) and read only memory (ROM).

The network node further comprises an I/O interface 62 for communicating with other external entities. Optionally, the I/O interface 62 also includes a user interface.

Other components of the network node are omitted in order not to obscure the concepts presented herein.

Figure 8:
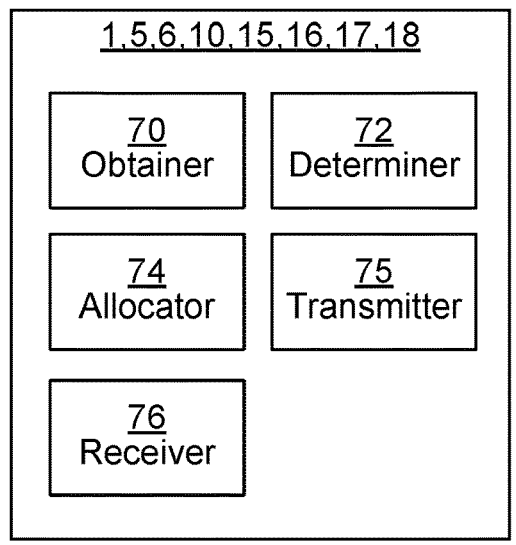
FIG. 8 is a schematic diagram showing functional modules of the network node of FIG. 7 according to one embodiment.

FIG. 8 is a schematic diagram showing functional modules of the network node of FIG. 7 according to one embodiment. The modules are implemented using software instructions such as a computer program executing in the network node. Alternatively or additionally, the modules are implemented using hardware, such as any one or more of an ASIC (Application Specific Integrated Circuit), an FPGA (Field Programmable Gate Array), or discrete logical circuits. The modules correspond to the steps in the methods illustrated in FIGS. 5A to 5D.

An obtainer 70 corresponds to step 40. A determiner 72 corresponds to steps 42, 42a, 42b, 43, 47, and 48. An allocator 74 corresponds to step 44. A transmitter 75 corresponds to steps 45, 46, 49, and 42c. A receiver 76 corresponds to step 42d.

Figure 9:
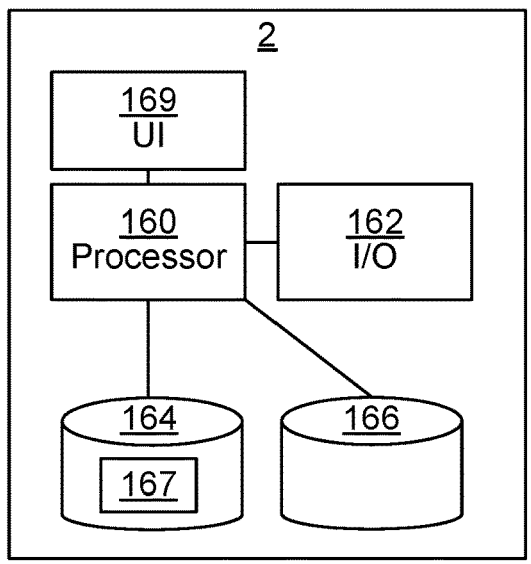
FIG. 9 is a schematic diagram illustrating components of any of the wireless device of FIG. 1.

FIG. 9 is a schematic diagram illustrating components of any of the wireless device 2 of FIG. 1. A processor 160 is provided using any combination of one or more of a suitable central processing unit (CPU), multiprocessor, microcontroller, digital signal processor (DSP), application specific integrated circuit etc., capable of executing software instructions 167 stored in a memory 164, which can thus be a computer program product. The processor 160 can be configured to execute the method described with reference to FIGS. 6A-B above.

The memory 164 can be any combination of read and write memory (RAM) and read only memory (ROM). The memory 164 also comprises persistent storage, which, for example, can be any single one or combination of magnetic memory, optical memory, solid state memory or even remotely mounted memory.

A data memory 166 is also provided for reading and/or storing data during execution of software instructions in the processor 160. The data memory 166 can be any combination of read and write memory (RAM) and read only memory (ROM).

The wireless device further comprises an I/O interface 162 for communicating with other external entities. Also, the wireless device comprises a user interface 169 to receive input from the user and provide output to the user. For instance, the user interface 169 may comprise any one or more of the following: a display, a touch sensitive display, a speaker, a microphone, physical keys, a microphone, etc. The user interface 169 can be used to present warnings with regard to availability due to negative events.

Other components of the wireless device are omitted in order not to obscure the concepts presented herein.

Figure 10:
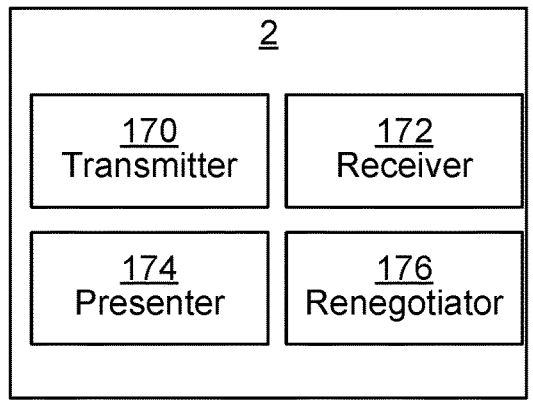
FIG. 10 is a schematic diagram showing functional modules of the wireless device of FIG. 9 according to one embodiment.

FIG. 10 is a schematic diagram showing functional modules of the wireless device 2 of FIG. 9 according to one embodiment. The modules are implemented using software instructions such as a computer program executing in the wireless device 2. Alternatively or additionally, the modules are implemented using hardware, such as any one or more of an ASIC (Application Specific Integrated Circuit), an FPGA (Field Programmable Gate Array), or discrete logical circuits. The modules correspond to the steps in the methods illustrated in FIGS. 6A and 6B.

A transmitter 170 corresponds to step 50. A receiver 172 corresponds to steps 52 and 54. A presenter 174 corresponds to step 56. A renegotiator 176 corresponds to step 58.

Figure 11:
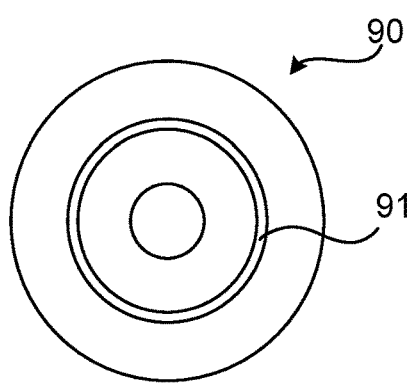
FIG. 11 shows one example of a computer program product comprising computer readable means.

FIG. 11 shows one example of a computer program product comprising computer readable means. On this computer readable means a computer program 91 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the computer program product 64 of FIG. 7 or the computer program product 164 of FIG. 9. While the computer program 91 is here schematically shown as a track on the depicted optical disk, the computer program can be stored in any way which is suitable for the computer program product, such as a removable solid state memory, e.g. a Universal Serial Bus (USB) drive.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method performed in a network node of a cellular communication network, the method comprising the steps of:

obtaining an indicator to secure a traffic availability for a connection, wherein the traffic availability is related to how likely the connection will remain operable;

determining that the network node is unable to secure resources to support the traffic availability;

determining a lower traffic availability that can be secured, the lower traffic availability being lower than the traffic availability of the indicator;

transmitting a negative response when the network node is unable to secure resources to support the traffic availability, wherein the negative response comprises the lower traffic availability;

wherein the traffic availability comprises an availability parameter indicating the number of redundant communication paths, wherein the availability parameter indicates a number of redundant communications paths greater than one, wherein the method is repeated for any new request comprising an indicator to secure the lower traffic availability.

2. The method according to claim 1, wherein the step of obtaining an indicator comprises receiving a request comprising the indicator.

3. The method according to claim 1, wherein the step of obtaining an indicator comprises determining the indicator based on a wireless device of one end of the connection.

4. The method according to claim 1, wherein the step of obtaining an indicator comprises determining the indicator based on a network slice associated with the connection.

5. The method according to claim 1, wherein the step of obtaining an indicator comprises determining the indicator based on a user service identifier for the wireless device.

6. The method according to claim 1, wherein the step of determining that the network node is unable to secure resources comprises determining at least one of:
   determining that the network node is unable to secure internal resources to support the traffic availability; and
   determining external capability by determining that a link connected to the network node or another network node is unable to secure external resources to support the traffic availability.

7. The method according to claim 6, wherein the step of determining external capability comprises:
   transmitting a request to an external resource to secure the traffic availability for the connection; and
   receiving a response from the external resource indicating whether the external resource can support the traffic availability.

8. The method according to claim 1, wherein the traffic availability comprises a plurality of availability parameters.

9. The method according to claim 1, wherein the traffic availability comprises any one or more of: a parameter indicating maximum relative processor load of traversed network nodes, a parameter indicating maximum relative link load of traversed links, a parameter indicating operable power backup of traversed network nodes, a parameter indicating a rate of packets which are passed through traversed network nodes, a parameter indicating a rate of packets which are passed through traversed links, a parameter indicating a proportion of time that traversed network nodes are operable, a parameter indicating a proportion of time that traversed links are operable, number of network node breaks per time unit, and number of node breaks per time unit.

10. The method according to claim 1, further comprising the step of:
    transmitting a warning signal when the network node detects an event which negatively affects traffic availability of the connection.

11. A network node comprising:
    a processor; and
    a memory storing instructions that, when executed by the processor, causes the network node to:
    obtain an indicator to secure a traffic availability for a connection, wherein the traffic availability is related to how likely the connection will remain operable;
    determine that the network node is unable to secure resources to support the traffic availability;
    determine a lower traffic availability that can be secured, the lower traffic availability being lower than the traffic availability of the indicator;
    transmit a negative response when the network node is unable to secure resources to support the traffic availability, wherein the negative response comprises the lower traffic availability;
    wherein the traffic availability comprises an availability parameter indicating the number of redundant communication paths, wherein the availability parameter indicates a number of redundant communications paths greater than one, and
    wherein the instructions are repeated for any new request comprising an indicator to secure the lower traffic availability.

12. The network node according to claim 11, wherein the instructions to obtain an indicator comprise instructions that, when executed by the processor, causes the network node to receive a request comprising the indicator.

13. The network node according to claim 11, wherein the instructions to obtain an indicator comprise instructions that, when executed by the processor, causes the network node to determine the indicator based on a wireless device of one end of the connection.

14. The network node according to claim 11, wherein the instructions to obtain an indicator comprise instructions that, when executed by the processor, causes the network node to determine the indicator based on a network slice associated with the connection.

15. The network node according to claim 11, wherein the instructions to obtain an indicator comprise instructions that, when executed by the processor, causes the network node to determine the indicator based on a user service identifier for the wireless device.

16. The network node according to claim 11, wherein the instructions to determine that the network node is unable to secure resources comprise instructions that, when executed by the processor, causes the network node to:
    determine that the network node is unable to secure internal resources to support the traffic availability; and
    determine external capability by determining that a link connected to the network node or another network node is unable to secure external resources to support the traffic availability.

17. The network node according to claim 16, wherein the instructions to determine external capability comprise instructions that, when executed by the processor, causes the network node to:
    transmit a request to an external resource to secure the traffic availability for the connection; and
    receive a response from the external resource indicating whether the external resource can support the traffic availability.

18. The network node according to claim 11, wherein the traffic availability comprises a plurality of availability parameters.

19. The network node according to claim 11, wherein the traffic availability comprises any one or more of: a parameter indicating maximum relative processor load of traversed network nodes, a parameter indicating maximum relative link load of traversed links, a parameter indicating operable power backup of traversed network nodes, a parameter indicating a rate of packets which are passed through traversed network nodes, a parameter indicating a rate of packets which are passed through traversed links, a parameter indicating a proportion of time that traversed network nodes are operable, a parameter indicating a proportion of time that traversed links are operable, number of network node breaks per time unit, and number of node breaks per time unit.

20. The network node according to claim 11, further comprising instructions that, when executed by the processor, causes the network node to:
transmit a warning signal when the network node detects an event which negatively affects traffic availability of the connection.

21. A method performed in a wireless device of a cellular communication network, the method comprising the steps of:
transmitting a request to a network node, the request comprising an indicator to secure a traffic availability for a connection, wherein the traffic availability is related to how likely the connection will remain operable;
receiving a negative response when the network node is unable to support the traffic availability; and
presenting a user warning indicating reduced traffic availability on a user output device of the wireless device;
wherein the traffic availability comprises an availability parameter indicating the number of redundant communication paths, wherein the availability parameter indicates a number of redundant communications paths greater than one,
wherein the traffic availability further comprises an indicator of a maximum acceptable number of common nodes being common between at least two of the redundant communication paths, and
wherein the maximum acceptable number of common nodes is zero.

22. The method according to claim 21, further comprising renegotiating a new traffic availability with the network node.

23. The method according to claim 21, further comprising receiving a warning signal when the network node detects an event which negatively affects traffic availability of the connection.

24. The method according to claim 1, wherein the traffic availability further comprises an indicator of a maximum acceptable number of common nodes being common between at least two of the redundant communication paths.

25. The method according to claim 24, wherein the maximum acceptable number of common nodes is zero.

26. The network node according to claim 11, wherein the traffic availability further comprises an indicator of a maximum acceptable number of common nodes being common between at least two of the redundant communication paths.

27. The network node according to claim 26, wherein the maximum acceptable number of common nodes is zero.

* * * * *